May 21, 1957     E. KUHNLE     2,793,025
PRICE INDICATING APPARATUS FOR WEIGHING SCALES
Filed March 11, 1953
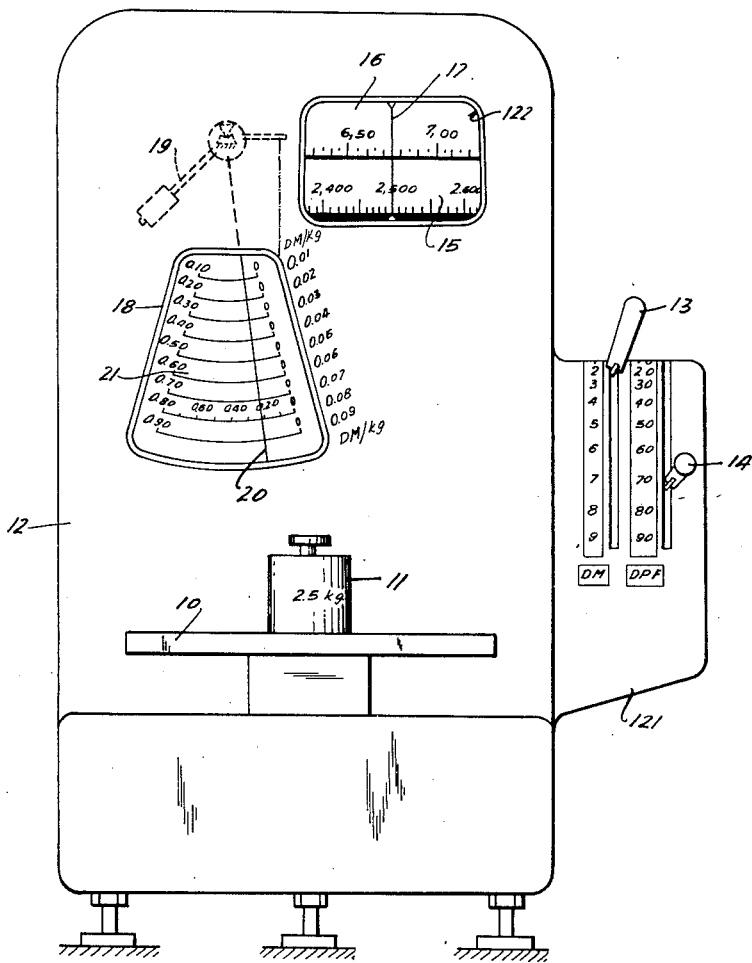
INVENTOR.
Ernst Kuhnle
BY Michael S. Striker

# United States Patent Office 2,793,025
Patented May 21, 1957

2,793,025
PRICE INDICATING APPARATUS FOR WEIGHING SCALES

Ernst Kuhnle, Balingen, Germany

Application March 11, 1953, Serial No. 341,776

Claims priority, application Germany March 20, 1952

2 Claims. (Cl. 265—29)

The present invention relates to weighing scales.

More particularly, the present invention relates to a price indicating apparatus for weighing scales.

There are certain types of scales for weighing materials and indicating the price thereof according to which the price per unit weight is manually set into the scale. With this type of scale, the prices are usually set in to the nearest tenth part of a dollar, for example, and although apparatus has already been provided to additionally set in a price per unit weight to the nearest hundredth of a dollar or other monetary denomination, these devices are generally quite elaborate and expensive so that they are not generally used.

One of the objects of the present invention is to overcome the above disadvantages by providing a weighing scale with an exceedingly simple apparatus for indicating the price to the nearest hundredth of a dollar, for example.

Another object of the present invention is to provide an apparatus of this type which may be very conveniently added to a scale capable of indicating the price to the nearest tenth part of a dollar or other monetary denomination.

With the above objects in view, the present invention mainly consists of a weighing scale which includes an apparatus for setting into the scale, for a unit of weight, a price which is an even fraction of a monetary denomination, and the scale further includes a means for indicating the portion of tenth parts of this fraction to be figured into the price of an article being weighed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Referring now to the drawing, it will be seen that the invention is applied to a weighing scale provided with a closed housing 12 having a weighing mechanism actuated by the pan 10 when a weight is placed on the latter, a weight 11 of 2.5 kg. being illustrated on the pan 10 in the particular example shown in drawing.

The right hand part of the housing 12, as viewed in the drawings, is provided with an extension 121 from which the operating levers 13 and 14 extend for setting the price per unit weight into the scale. For example, the lever 13 sets in the price to the nearest dollar and the lever 14 sets in the price per unit weight to the nearest tenth of a dollar. Thus, in the particular example illustrated in the drawing, a price of $2.70 per kg. has been set into the scale.

Two illuminated scales are visible in window 122 of housing 12, the lower one 15 of these scales indicating the weight and the upper one 16 of these scales indicating the price. Thus, for the example shown, the lower scale 15 shows a weight of 2.50 kg. and the upper scale 16 shows a price of $6.75, these scales 15 and 16 being read by means of an index line 17 on the window 122.

In the illustrated example, the housing 12 includes a further window 18 behind which an indicator member 20 is movable, this member 20 being connected to the weighing mechanism 19 of the scale to be turnably moved by the weighing mechanism across the window 18 in accordance with the weight of the article placed on the pan 10. On the side of the indicating member 20 opposite from the window 18 and visible in the latter is a stationary indicia-carrying member 21 which includes in the illustrated example nine substantially parallel scales respectively, for even hundredth parts of a dollar, as shown, and tending from 0 to different tenth parts of a dollar, respectively, as shown, and indicating the price for the portion of the price per unit weight which is a hundredth part of a dollar.

With the help of this simple additional price indicating mechanism, it is possible to very easily determine the price of an article to the nearest hundredth part of a dollar. For example, let it be assumed that the price per unit weight is $2.78. Then the operator would simply look at the next to the bottom-most scale on the indicia-carrying member 21 which is marked 0.08 and extends from 0 to 0.8, and on this scale the indicator member 20 in the illustrated example indicates 0.20 so that the operator adds $0.20 to the indicated price of $6.75 so that the total price is $6.95. Also, it would be possible to set the operating member 14 at the 80% mark and determine the price at the rate of $2.80 per unit weight which for the 2.5 kg. weight shown would be $7.00. Then the indication of member 20 on the second scale of indicia-carrying member 21 is read, that is on the scale for $0.02 and extending from 0 to 0.20, and the reading on this scale is 0.05 which is subtracted from the $7.00 reading on scale 16 to give the final value of $6.95.

The above-described embodiment of the invention obviously is only one of many possible ways for practising the invention. For example, the window 18 and its associated parts may be located at any desired part of the scale and may be provided in duplicate if desired so that the purchaser as well as the seller may read this scale. It is also possible to project the price indicated by parts 20 and 21 optically to the window 22 to be read there with the other price indication. Also, the indicia-carrying member 21 may be turned with respect to the indicator 20 which would then remain stationary.

It is evident that the invention is adaptable for use in many different countries having different monetary denominations and may be used to indicate a thousandth or ten thousandth part of a given denomination rather than a hundredth part thereof.

It will be understood that each of the elements described above, or two or more together, may also find a useful application in other types of weighing scales differing from the types described above.

While the invention has been illustrated and described as embodied in a price indicating apparatus for weighing scales, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a weighing scale, in combination, a weighing mechanism for weighing an article; apparatus for setting into the scale, for unit of weight, a price which is an even fraction of a monetary denomination; first indicating means operated by said weighing mechanism for indicating the price of a weighed article whose cost per unit of weight is said even fraction set into the scale by said apparatus; and second indicating means on the scale for indicating the portion of tenth parts of said fraction to be figured into the price of a weighed article, said second indicating means being independent of said apparatus for setting into the scale a price per unit of weight which is an even fraction of a monetary denomination and being operatively connected directly to said weighing mechanism to be operated thereby, whereby said first and second indicating means indicate the price of a weighed article to a tenth of said fraction, said second indicating means including an indicia carrying member and an indicating member located opposite each other on the scale, one of said members being stationary and the other of said members being connected to said weighing mechanism to be moved thereby with respect to said stationary member.

2. In a weighing scale, in combination, a weighing mechanism for weighing an article; apparatus for setting into the scale, for a unit of weight, a price to the nearest tenth part of a dollar; first indicating means operated by said weighing mechanism for indicating the cost of a weighed article at a price per unit weight equal to the nearest tenth part of a dollar set into the scale by said apparatus; and second indicating means on the scale for indicating the hundredth part of a dollar to be figured into the price of the weighed article, said second indicating means being independent of said apparatus for setting into the scale a price per unit of weight to the nearest tenth part of a dollar and being operatively connected directly to said weighing mechanism to be operated thereby, whereby said first and second indicating means indicate the price of a weighed article to the nearest hundredth of a dollar, said second indicating means including a stationary indicia carrying member and an indicating member located opposite said stationary member and connected to said weighing mechanism to be turned thereby about a predetermined axis and across said stationary indicia carrying member, the latter having arranged thereon nine successive arcuate scales for different tenth parts of a dollar, respectively, each of said scales being located along a circle whose center is in said axis.

References Cited in the file of this patent

UNITED STATES PATENTS

| 1,124,052 | Mercer | Jan. 5, 1915 |
| 2,220,668 | Weckerly | Nov. 5, 1940 |
| 2,584,897 | Marco | Feb. 5, 1952 |

FOREIGN PATENTS

| 329,059 | Italy | Aug. 29, 1935 |